Figure 1:
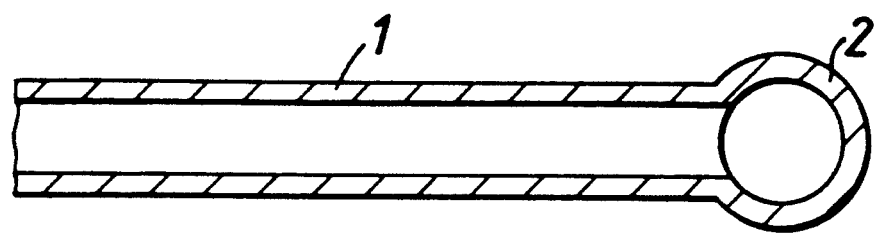

United States Patent [19]

Elgar et al.

[11] Patent Number: 5,327,924
[45] Date of Patent: Jul. 12, 1994

[54] ABANDONMENT OF A BRANCH MAIN

[75] Inventors: Anthony D. Elgar, Mitcham; Brian T. Sales, Dorking; Adrian S. Parkes, Burgess Hill, all of United Kingdom

[73] Assignee: British Gas PLC, London, United Kingdom

[21] Appl. No.: 86,458

[22] Filed: Jul. 6, 1993

Related U.S. Application Data

[63] Continuation of Ser. No. 757,212, Sep. 10, 1991, abandoned.

[30] Foreign Application Priority Data

Sep. 12, 1990 [GB] United Kingdom ............. 9019905.0

[51] Int. Cl.5 .............................................. F16L 55/10
[52] U.S. Cl. .................................... 137/15; 137/315; 138/89
[58] Field of Search .................... 137/15, 315; 138/94, 138/93, 89, 97

[56] References Cited

U.S. PATENT DOCUMENTS

| | | | |
|---|---|---|---|
| 587,102 | 7/1897 | Meany | 138/93 |
| 1,814,677 | 7/1931 | Fennema | 138/93 |
| 1,906,151 | 4/1933 | Goodman | 138/93 |
| 1,946,138 | 2/1934 | Gardner | 138/93 |
| 2,390,461 | 12/1945 | Racz . | |
| 3,032,069 | 5/1962 | Ficklin | 137/315 |
| 4,245,970 | 1/1981 | St. Onge . | |
| 4,458,721 | 7/1984 | Yie et al. | 137/318 X |
| 4,869,281 | 9/1989 | Rockower | 137/15 |

FOREIGN PATENT DOCUMENTS

| | | |
|---|---|---|
| 26742 | 10/1984 | Australia . |
| 2644080 | 4/1978 | Fed. Rep. of Germany . |
| 352639 | 8/1905 | France . |
| WO82/04086 | 11/1982 | PCT Int'l Appl. . |
| 1527267 | 10/1978 | United Kingdom . |
| 1588714 | 4/1981 | United Kingdom . |
| 2132309 | 7/1984 | United Kingdom . |
| 2167830 | 6/1986 | United Kingdom . |
| 2227071 | 7/1990 | United Kingdom . |

OTHER PUBLICATIONS

Abstract of U.S. Pat. No. 4,295,494.

Primary Examiner—Gerald A. Michalsky
Attorney, Agent, or Firm—Oblon, Spivak, McClelland, Maier & Neustadt

[57] ABSTRACT

A method for abandoning a branch main 1 joined to a fluid-carrying spine main 2 comprises gaining access to the bore of the branch main 1 at an access point and then permanently blocking the bore of the branch main 1 at a blockage point closer to the junction then to the access point.

7 Claims, 3 Drawing Sheets

ABANDONMENT OF A BRANCH MAIN

This application is a continuation of application Ser. No. 07/757,212, filed on Sep. 10, 1991, now abandoned.

The present invention relates to the abandonment of a branch main joined to a fluid carrying spine main and to a device for preventing the flow of fluid along the branch main in the carrying out of this process.

Gas, water and sewage mains may need to be abandoned when they develop leaks or for other reasons. Leaks may develop at joints as a result of leak paths appearing within the joints in cast iron gas mains or as a result of cracks in the wall due to corrosion or mechanical damage in cast iron and other materials, e.g. ductile iron and steel, cement, brickword or plastics.

Present techniques of mains abandonment necessitate an excavation being made at the junction between the branch main and the spine main to disconnect the branch main from the spine main. This is frequently in the middle of a busy thoroughfare and the excavation may lead to disruption of both pedestrians and traffic.

It is therefore an object of the present invention to provide a method for abandoning a branch main joined to a spine main in such a way that such disruption may be much less.

It is also an object of the present invention to provide a device for preventing the flow of fluid along a fluid carrying main.

According to a first aspect of the invention, we provide a method for abandoning a branch main Joined to a fluid-carrying spine main, the method comprising gaining access to the bore of the branch main at an access point and then permanently blocking the bore of the branch main at a blockage point closer to the junction than to the access point.

According to a second aspect of the invention, we provide a device for preventing the flow of fluid along a gas-carrying main comprising a plug having a body adapted to block the bore of the main and means for connecting the plug to a rod or the like for pushing the body along the bore of the main to the point where the bore is to be blocked.

Figure 2:
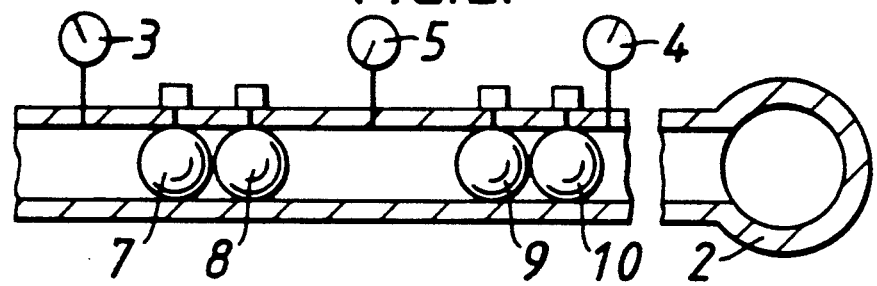
Figure 3:
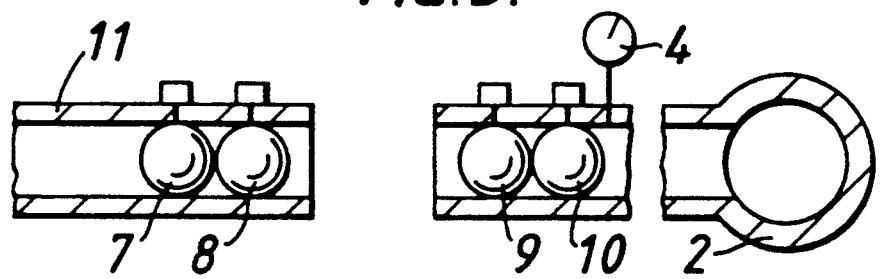
Figure 4:
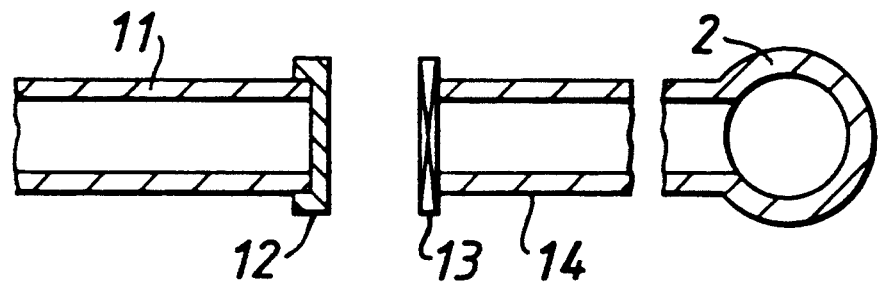
Figure 5:
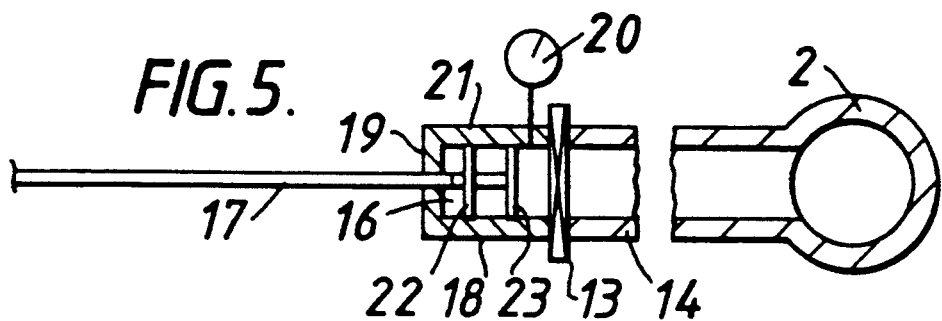
Figure 6:
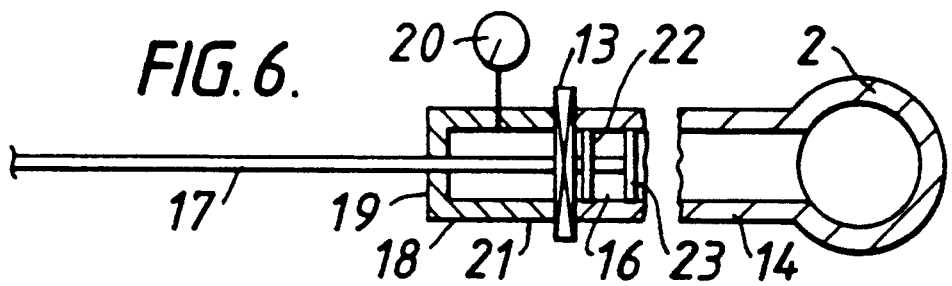
Figure 7:
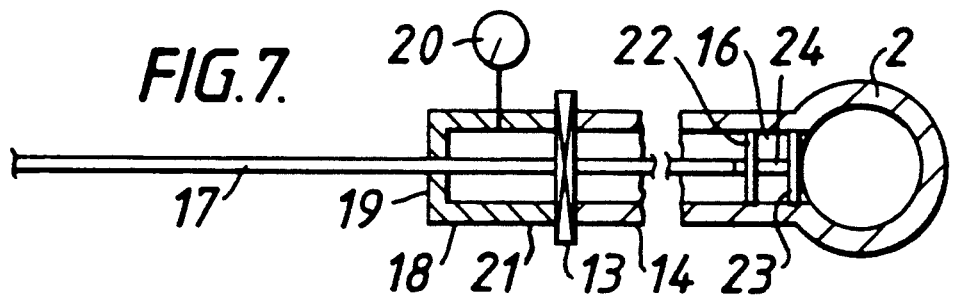
Figure 8:
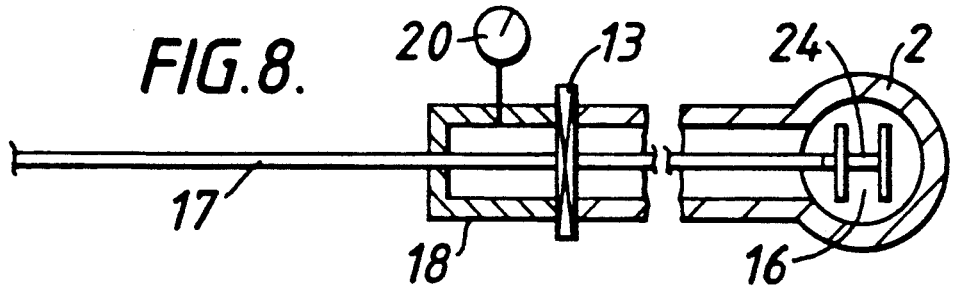
Figure 9:
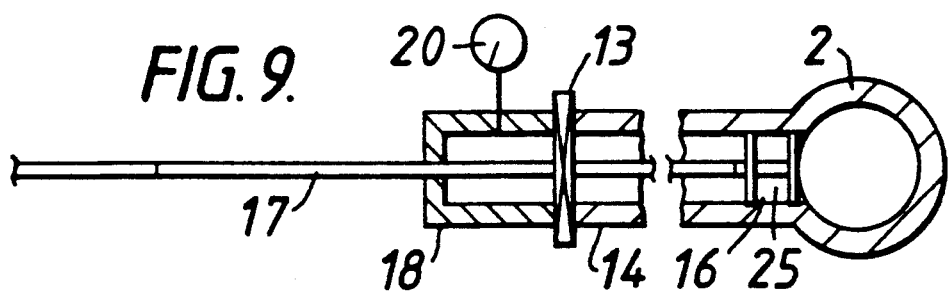
Figure 10:
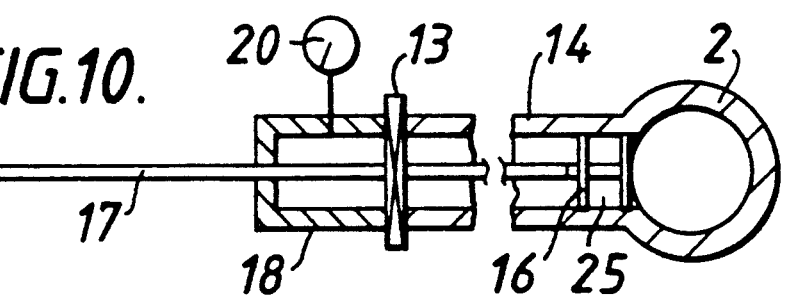
Figure 11:
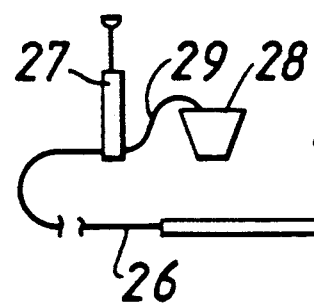
Figure 12:
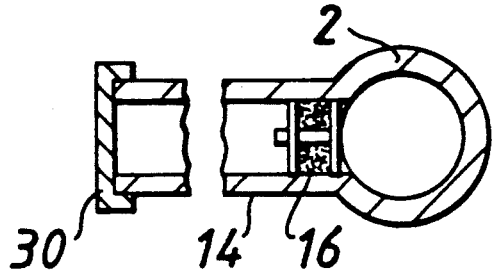

An embodiment of the invention will now be particularly described with reference to the accompanying drawings, showing in sequence the various steps in the method:

FIG. 1 shows a part length of a branch main joined to a spine feeder main,

FIG. 2 shows the position after the bore of the branch main has been temporarily blocked to permit the removal of a first section there from, FIG. 3 shows the position after a first section of the branch main has been removed, FIG. 4 shows the position after a full-bore gate valve has been fitted to the spine-main distal end of a second section of the branch main, the adjoining end of the remainder of the branch main having been capped off, FIG. 5 shows the position after a gland box or pig trap has been connected to the valve with a bore blocking plug housed within the gland box, FIG. 6 shows the position after the plug has been pushed through the open valve in the second section of the branch main, FIG. 7 shows the position before the plug is pushed into the spine main, FIG. 8 shows the position after the plug has been pushed into the spine main, FIG. 9 shows the position after the plug has been withdrawn into the branch main, FIG. 10 shows the position after one of the sections of pusher rod has been removed, FIG. 11 shows the position after a liquid settable sealant has been pumped to the plug, and FIG. 12 shows the position after the plug rods, valve and gland have been removed, the distal end of the second section of the branch main has been capped and the sealant has been allowed to set.

Referring to the drawings, FIG. 1 shows a branch main 1 joined to a larger diameter spine main 2. The spine main 2 may be carrying gas, water or sewage although the invention is particularly suitable for the abandonment of gas carrying mains. The spine main 2 may be a district feeder main, the branch main 1 supplying gas via service pipe offtakes (not shown) to domestic consumers. In this embodiment, the branch main 1 is also fed from a further spine main (not shown) at the other end of the branch main 2 but the method can be used with equal effect in a branch main fed from just one spine main.

In a first step in the method (FIG. 1), a length of the branch main 1 remote from the spine main 2 is exposed by excavation. The location of the excavated length may be in an area where excavation and re-instatement costs are low i.e. where disruption to pedestrians and traffic is a minimum.

Conventional pressure gauges 3 and 4 are connected by known techniques at spaced apart positions to the branch main 1. The gauges indicate the pressure of the gas at the connection points.

In the next step of the method (FIG. 2) a pressure gauge 5 is connected between the gauges 3 and 4 and a part of the branch main 1 lying between the gauges 3 and 4 but including the gauge 5 is sealed off from the flow of gas by the known technique of 'bagging off'. Here two pairs of removable inflatable rubber bags 7,8 and 9,10 respectively are inserted into the main 1 at spaced apart positions and are inflated as shown temporarily to block the bore of the main 1. The effectiveness of the blockage can be observed from the pressure reading on the gauge 5 which should be zero if the blockage is effective.

In the next step of the method (FIG. 3) a section of the main 1 lying between the bag 8 and the bag 9 is then removed by known techniques including sawing, this section then constituting the 'first section' of the branch main while the section still united to the spine main 2 is the 'second section' of main 1. Removal of the first section permits accesss to be gained to the bore of the main 1 via the free end of the second section. The pressure gauge 3 is removed and any hole necessary for its connection is plugged or sealed.

Next (FIG. 4) the end of the remote remainder 11 of the branch main 1 is capped off by a conventional end cap 12. The bags 7 and 8 are then deflated and removed through their insertion holes which may be plugged or sealed as conventional. Finally, the gauge 4 is removed.

A full bore known-type gate valve 13 is then connected as shown to the distal access end of the second section 14 of the branch main 1 and with the valve 13 closed the bags 9 and 10 are deflated and removed through their insertion holes which are plugged or sealed as conventional.

Referring to FIG. 5, a device in the form of a plug 16 is then attached by a suitable connection e.g. a screw connection to a rigid or semi-rigid hollow rod 17 which can enable the plug 16 to be pushed along the second section 14 of the main 1 from the valve end into the spine main 2 itself.

The plug 16 is initially housed within a known-type gland box or pig trap 18. The gland box 18 has an entry wall 19 formed of elastomeric components which form a hole through which the rod 17 may be inserted, the edge forming the hole providing a flexible seal for the outer wall of the rod 17.

The gland box 18 is connected to the valve 13 but prior to this, the rod 17 is inserted through the hole in the gland wall 19 so that the plug 16 is located within the gland box 18 as shown and previously mentioned. The seal between the gland box 18 and the rod 17 is effective in preventing gas escaping through the gland wall 19 when the valve 13 is opened. A further pressure gauge 20 is as shown connected to a side wall 21 of the gland box 18 to indicate the pressure within the gland box 18. The rod 17 can be an integral length or comprise individual short sections connected by screw threads or snap couplings.

While not shown in detail the plug 16 itself comprises an assembly of a pair of apertured discs assemblies 22,23 located on either end of a hollow spindle 24 which has an externally threaded end for connection to the internally threaded bore of the rod. Each assembly comprises a central disc sandwiched between two outer discs on either side of the disc. Each central disc is of a suitable flexible material such as rubber and each outer disc is of a rigid material such as a metal for instance steel. The diameter of each rubber disc is slightly greater than the internal diameter of the section 14 so that the discs effect a blockage of the bore. The spindle 24 has a number of apertures (not shown) lying between the assemblies 22,24, the apertures forming outlets for a liquid settable sealant supplied to the spindle 24 up the bore of the hollow rod 17. When the plug 16 is in the correct position in the section 14 of the main, as will be described, the rod 17 is rotated to operate a mechanism in the plug 16 which increases the diameter of the discs by pressing each rubber disc between the two outer discs between which each rubber disc is sandwiched. Thus the rubber discs tightly engage with the internal wall of the main 1. Once in position the sealant can be pumped to the spindle 24 to emerge into the chamber 25 formed between the assemblies 22,23 and the spindle 24. The sealant may be a glue such as an epoxy or anaerobic type and is then allowed to set.

Referring to FIG. 6, in the next stage of the method, the valve 13 is opened and the plug 16 is pushed from the gland box 18 into the section 14 of the main 1. At this stage the pressure on the gland box gauge 20 should be reading zero indicating that the plug 16 is blocking the bore of the section 14 thereby preventing gas from entering the gland box 18.

The plug 16 is pushed further until it reaches the position shown in FIG. 7, i.e. adjacent to the junction.

The plug 16 is now pushed still further (FIG. 8) until it enters the spine main 2. At this stage there will be a pressure reading on the gauge 20 indicating gas flow to this point. The plug 16 is pushed until it engages the far wall of the spine main 2.

The plug 16 is now pulled back to the position shown in FIG. 9 which position is similar to that shown in FIG. 7 with the gauge 20 reading zero.

As long as the leading section of the rod 17 terminates outside the gland entry wall 19 as shown in FIG. 9 any remaining sections may be unscrewed and removed as shown in FIG. 10.

The gland box 18 and valve 13 can then be removed as shown in FIG. 11 and a hose or tube 26 connected to the end of the rod 17.

The hose 26 is connected to a hand pump 27 which is supplied with sealant from a container 28 via a hose 29. Sealant such as a water based cementitious grout, cement, epoxy or anaerobic is then pumped into the chamber 25 between the assemblies 22 and 23 and spindle 24 until the chamber 25 is completely filled. The sealant is then allowed to cure so that the blockage of the bore of the main section 14 is permanent.

Finally, a known type end cap 30 is fitted to the distal end of the section 14 as shown in FIG. 12, there now being a solid fluid tight seal between the plug 16 and the end cap 30 and the excavation is filled in as conventional and the road or pavement surface made in accordance with normal practice.

The method described permits the excavation exposing the main to be located remotely from the junction between the branch and spine mains in an area where the reinstatement costs are low and/or where disruption to pedestrians and traffic flow is at a minimum, thereby causing less inconvenience to the public at large.

The plug 16 described is only one of many suitable versions. Instead of the rubber discs being squeezed between metal plates, the discs can be distorted outwardly by means of a wedge being pulled through the discs.

Alternatively the plug could comprise a rubber or elastomeric plunger partly if required reinforced by metal reinforcing. The plug might also comprise a sponge with or without a closed cell structure.

Where a sponge plug is employed it may with advantage be soaked in a sealant such as an anaerobic sealant before it is inserted into the main whereby when the sealant is cured the plug becomes rigid and adheres to the internal wall of the main.

While not described the whole of the section of the branch main could be filled with sealant pumped directly through the gland into the main instead of via the rod.

That which is claimed:

1. A method for abandoning a branch main joined to a fluid-carrying spine main, the method comprising the steps of exposing a portion of the branch main in preparation for abandonment, gaining access to the bore of the branch main at an access point and then permanently blocking the bore of the branch main at a blockage point closer to the junction than to the access point by positioning at the blockage point a plug having a sealant which, upon curing, adheres the plug to an internal wall of the branch main, wherein before access is gained, but subsequent to the exposing step, an aperture is made in the wall of the branch main upstream of said access point and the bore of the branch main it temporarily blocked upstream of the access point by introducing a blocking means into the bore of the branch main through the aperture in the wall of the branch main.

2. A method as claimed in claim 1 in which before the branch main is permanently blocked the temporary blockage is removed while preventing the escape of fluid from the access point both during and after removal of the temporary blockage.

3. A method as claimed in any of claims 1 or 2 in which permanent blocking of the bore of the branch main is effected while preventing the escape of fluid from the access point.

4. A method as claimed in claim 1 in which the blockage point is located adjacent to the junction between the branch main and the spine main.

5. A method as claimed in claim 1 in which access is gained to the branch main by removing a first section of the branch main to leave a second section of the branch main joined to the spine main, the distal end of the second section forming the access point.

6. A method as claimed in claim 1, wherein said step of permanently blocking comprises:

introducing into the bore of the main branch at the access point said plug, comprising an assembly of a spindle and two axially spaced discs having diameters substantially equal to that of the bore;

advancing the assembly to through the bore to the blockage point; and filling a space between the discs with a settable sealant.

7. A method as claimed in claim 6, wherein said spindle is hollow and said filling step comprises delivering a liquid sealant through the spindle to the space between the discs.

* * * * *